(12) United States Patent
O'Donnell et al.

(10) Patent No.: US 6,880,194 B2
(45) Date of Patent: Apr. 19, 2005

(54) PORTABLE RAMP ASSEMBLY

(75) Inventors: Michael R. O'Donnell, Orchard Park, NY (US); Paul D. Rowell, Elma, NY (US); Douglas R. Wroblewski, Wattsburg, PA (US); Roy J. Sasiadek, Orchard Park, NY (US); Paul A. Hoffman, Orchard Park, NY (US)

(73) Assignee: Innovative Inventors, Inc., Orchard Park, NY (US)

(*) Notice: Subject to any disclaimer, the term of this patent is extended or adjusted under 35 U.S.C. 154(b) by 14 days.

(21) Appl. No.: 10/436,473

(22) Filed: May 13, 2003

(65) Prior Publication Data

US 2004/0226116 A1 Nov. 18, 2004

(51) Int. Cl.[7] .............................. E01D 1/00
(52) U.S. Cl. ...................... 14/69.5; 14/71.1; 254/88
(58) Field of Search ................. 14/69.5, 71.1; 384/42; 254/88

(56) References Cited

U.S. PATENT DOCUMENTS

| | | | | | |
|---|---|---|---|---|---|
| 3,977,545 | A | * | 8/1976 | Lloyd | 414/537 |
| 4,900,217 | A | * | 2/1990 | Nelson | 414/537 |
| 5,380,144 | A | * | 1/1995 | Smith et al. | 414/537 |
| 5,429,438 | A | * | 7/1995 | Wood | 384/42 |
| 5,795,125 | A | * | 8/1998 | Walkden | 414/537 |
| 5,813,071 | A | * | 9/1998 | Breslin et al. | 14/71.1 |
| 6,042,923 | A | * | 3/2000 | Lewis | 428/68 |
| 6,484,644 | B1 | * | 11/2002 | Forbes et al. | 105/421 |

* cited by examiner

Primary Examiner—Thomas B. Will
Assistant Examiner—Raymond W Addie

(57) ABSTRACT

A portable ramp assembly has many uses, but is especially designed to fit within the flat bed of a pick-up truck which, for example, has an eight foot long flat bed. The assembly comprises a housing which is sufficiently wide to accommodate two separate ramps in side-by-side separated relation. The housing is provided with special blocks for engaging the trailing ends of the ramps and lifting them to be closely aligned with the top, exposed surface of the housing, so as to at least reduce any abrupt offsets between the tops of the housing and adjacent trailing ends of the ramps. Special plastic guides are provided between the ramps and housing to facilitate movement of the ramps and keep them in proper lateral alignment as they move into and out of the housing.

20 Claims, 1 Drawing Sheet

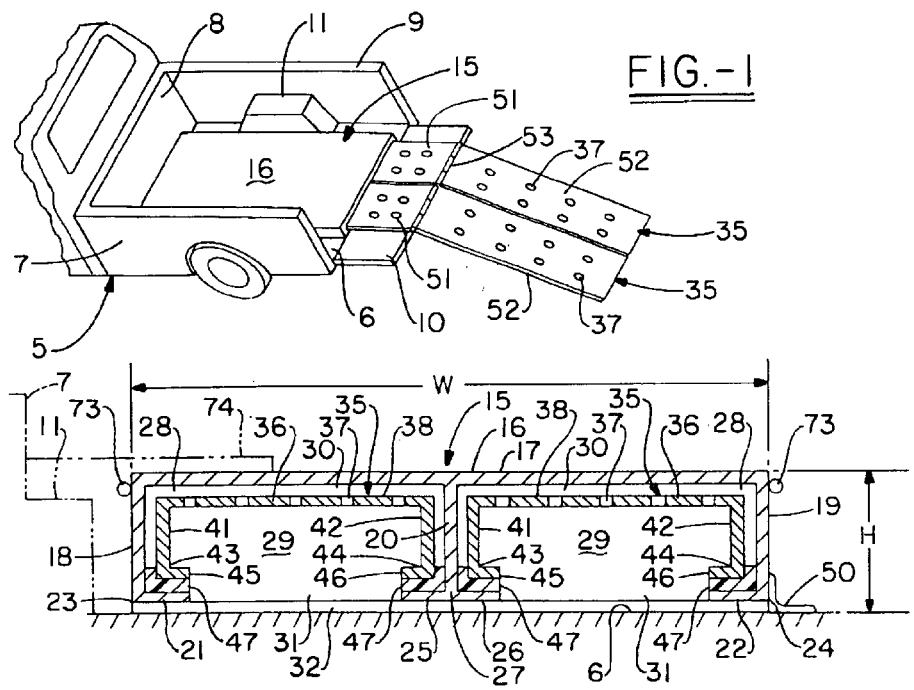
FIG.-1
FIG.-2
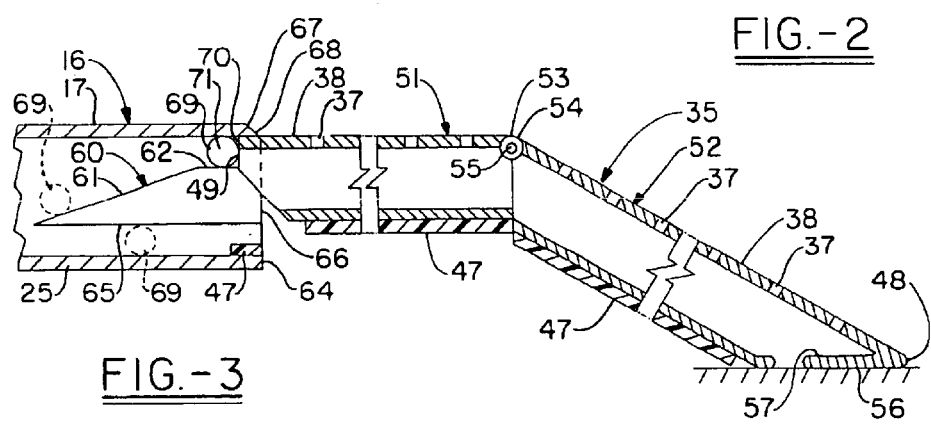
FIG.-3
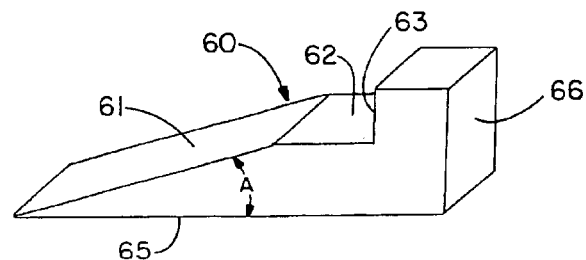
FIG.-4

PORTABLE RAMP ASSEMBLY

BACKGROUND OF THE INVENTION

The invention relates to ramps, especially to lightweight portable ramps that can be used in pick-up type trucks, as disclosed in U.S. Pat. No. 6,042,923. This patent describes a pair of ramps which are movable into and out of an opening in an, otherwise, enclosed envelope that is secured to the bed of a pick-up truck. It can be appreciated that dust and dirt can collect in such an envelope to hinder and obstruct movement of the ramps.

The invention relates to improvements in such portable ramps to overcome such problems and others which will become apparent to those skilled in the art.

DESCRIPTION OF THE DRAWING

The following description of the invention will be better understood by having reference to the accompanying drawing, wherein:

FIG. 1 is a partial perspective view of a pick-up truck and a portable ramp assembly which can be used in the flat bed of such a truck;

FIG. 2 is a typical cross-sectional view of a portable ramp assembly which is made in accordance with the invention, this view being designed to show the ramps of the assembly when they are retracted in a housing of the assembly;

FIG. 3 is a longitudinal section primarily of the ramps and a unique mechanism, carried by the housing, for engaging and lifting the tail end of each ramp more in line with the outer top surface of the housing when the ramps are in there fully extended positions from the housing, the mechanism also designed to prevent the ramps from being accidentally removed from the housing; and FIG. 4 is a perspective view of the aforementioned ramp lifting and stopping mechanism.

DETAILED DESCRIPTION OF THE DRAWING

With general reference to the drawing for like parts, and particular reference to FIG. 1, there is shown a pick-up truck 5 which has a flat bed 6 that is defined by three upstanding sides 7–9 and a tailgate 10 of the truck 5. There are a pair of similar, rear wheel fenders 11 which extend from the opposing side walls 7 and 9 towards each other to reduce the flat bed 6 from a rectangular shape to a dumbbell-like configuration.

A portable ramp assembly 15 is designed to be positioned on the flat bed 6, and is laterally sized to fit between the opposing wheel fenders 11, and is longitudinally sized to fit between the cab wall 8 and the opposing tailgate 10, when the tailgate 10 is closed in an upright position.

With particular reference to FIG. 2, the portable ramp assembly 15 comprises a housing 16 which has a rectangular, solid flat top plate 17 which is secured to, and supported in parallel relation with, the flat bed 6 by a pair of similarly sized, outer, solid flat side walls 18 and 19 and a similarly sized, solid flat inner wall 20 that is equally spaced between the outer side walls 18 and 19. The walls 18–20 are substantially coextensive with the length of the top plate 17. The outer side walls 18 and 19 have similarly sized, short flat flanges 21 and 22 which extend towards each other in parallel relation with the top plate 17 from adjacent opposing free marginal edges 23 and 24 of the outer side walls 18 and 19. The inner wall 20 has similarly sized, short flat flanges 25 and 26 which extend from the free marginal edge 27 of the inner wall 20 in opposing directions towards the opposing flanges 21 and 22 of the outer side walls 18 and 19. The short flanges 21,22,25 and 26 are coextensive with the length of the walls 18–20, and are in the same plane which is parallel to the plane of the top plate 17. The inner wall 20 divides the housing 16 laterally into two side-by-side, longitudinally extending and partially enclosed twin compartments 28 which have open ends 29, adjacent the tailgate 10, and opposing closed ends 30 adjacent the cab wall 8, when the housing 15 is properly positioned on the flat bed 6. The twin compartments 28 also have open bottoms 31, except for the short flanges 21,22,25 and 26. A plurality of similarly sized thin, but sufficiently rigid straps or cross ties 32 may be, optionally, secured to the short flanges 21,22,25 and 26 transversely of the housing 16 and longitudinally spaced thereon to make the housing 16 even more rigid, if desired.

The twin compartments 28 are designed to slidably receive a pair of similar ramps 35, each of which comprises a rectangular cover plate 36 which is randomly perforated with holes 37 to preferably provide a non-skid outer surface 38 which is less susceptible to the accumulation of dust and dirt. In some instances, the outer surface 38 of the ramps 35 can be smooth, or provided with a non-skid painted material. The perforated cover plates 36 are each secured at right angles to a pair of similarly sized, parallel side walls 41 and 42 which are coextensive with the length of the cover plates 36. The side walls 41 and 42 of each of the ramps 35 have a pair of opposing marginal edges 43 and 44 at which are disposed a pair of short flanges 45 and 46 which are in the same plane which is parallel to the plane of the cover plate 36. The short flanges 45 and 46 of the ramps 35 are supported on, and movable along, the adjacent short flanges 21,22,25 and 26 of the housing 16 in which the ramps 35 are stored.

A pair of hard and durable, similarly sized plastic guides 47 are disposed between the short flanges 45 and 46 of each of the ramps 35 and the supporting short flanges 21,22,25 and 26 of the housing 16. The plastic guides 47, as seen in FIG. 2, have rectangular cross sections, and are preferably secured to the short flanges 45 and 46 of the ramps 35 by any suitable means, e.g. screws or nuts and bolts. The plastic guides 47 terminate in closely spaced relation to the adjacent walls 18–20 of the housing 16 to help laterally guide the ramps 35 as they move along the short flanges of the housing 16. Further, the plastic guides 47 are at least partially longitudinally coextensive with the short flanges 45 and 46 of the ramps 35 to facilitate smooth movement of the ramps 35, rather than provide short plastic guides 47 to the short flanges 45 and 46 of the ramps 35 adjacent the leading and trailing ends 48 and 49 of the ramps 35.

The housing 16 is detachably secured to the truck bed 6 by any suitable means, e.g. similar L-shaped brackets 50 located at the four outside corners of the housing 16.

It should be apparent to one skilled in the art, that the portable ramp assembly 15 can be more easily, and less costly, fabricated from conventional components, as follows. The housing 16 is made of an aluminum top plate 17 which is from one quarter inches to one half inches thick and has a maximum width W of about forty-eight inches and a maximum length of about six or eight feet, depending on the length of the flat bed 6 which is about eight feet for a big pick-up truck 5, and about six feet for a small pick-up truck 5. The top plate 17 is welded to two outer side walls 18 and 19 which are standard four inch aluminum channel sections which have one-half inch thick webs and one-quarter inch thick short flanges. Further, the inner wall 20 can be two, four inch channel sections bolted or welded together in back-to-back relation, or it can be a single, conventional four inch I-beam which also has a one-half inch web and four outstanding short flanges which are one-quarter inches thick. The housing 16 and any cross-ties 31, if used, are preferably made of aluminum to make the housing 16 as light as possible, so that it can be easily lifted into and out of the flat bed 6 of a pick-up truck 5. It should also be appreciated that the housing 16 can be designed to hold a single ramp 35, a pair of twin ramps 35 as described herein, and even three separate ramps 35 in a forty-eight wide housing 16, if desired.

The ramps 35 can also be made of aluminum and customized to precisely fit within the side-by-side twin compartments 30 of the above-described forty-eight inch wide aluminum housing 16. However, stock lengths of prefabricated, perforated, two inch thick steel ramps 35 can be purchased in standard widths. For example, a stock ten inch wide prefabricated, steel ramp and a stock twelve inch wide prefabricated, steel ramp can be bolted or welded together in side-by-side relation to form a single ramp 35 which can be slidably mounted in each of the twin compartments 30 of the forty-eight inch wide housing 16. Such stock ramps 35 come with two differently sized perforations or holes 37 in the outer ramp surfaces 38 which can be smooth or non-skid which can be achieved by special paints or the perforations or holes 37. For example, the larger perforations or holes 37 are about one and one-quarter inch, in diameter, and the smaller holes are about one-quarter inch in diameter. The larger holes 37 are preferred, because dust, dirt and other debris are less likely to accumulated in them. The ramps 35 can each be made of one single section, or two dissimilar length sections which are hinged together, as seen in FIG. 3. For example, one piece ramps 35 can be used in applications where there is no tailgate, or when the tailgate 10 is removed or unhitched and moved out of interfering relation with the positioning of the ramps 35. Rather than unduly burden the user with such details, the portable ramp assemblies 15 are made with hinged ramps 35, so that the tailgate 10 can be generally aligned with the truck bed 6 to help support the ramps 35. In such cases, each ramp 35 is comprised of a short section 51 which is substantially as long as the tailgate 10 is wide, and a longer section 52 which [s rotatably mounted on the outer exposed end of the short section 51 by any suitable hinge 53, e.g. a piano-type hinge where the intermeshed knuckles 54 of the hinge 53 have a common pivot pin 55 and act as a relatively smooth transitional surface between the adjacent outer exposed surfaces 38 of the short and long sections 51 and 52 of each ramp 35. The outermost free or leading ends 56 of the long ramp sections 52 are at angles to provide better contact and smoother transition with a flat surface, and are provided with handholds 57, whereby the ramps 35 can be grabbed and pulled from the housing 16. The plastic guides 47, secured to the undersides of the short flanges 45 and 46 of each stock steel ramp 35, act to prevent corrosion from developing between the dissimilar metals of the aluminum of the housing 16 and the steel of the ramps 35.

It should be apparent from the above description that there is an abrupt offset or difference of about one to two inches between the outer exposed surface 17 of the housing 16 and the adjacent outer exposed surfaces 38 of the ramps 35, when the ramps 37 are fully extended from the housing 16. This situation is alleviated or highly improved when the ramps 35 are pulled from the housing, by the provision of four identical, unique lifting and stop (L&S) blocks 60, as best seen in FIGS. 3 and 4, in combination with certain adaptations made to the housing 16 and short ramp sections 51 of the ramps 35. Each one of the L&S blocks 60, when properly positioned in a level housing 16, has a ramp 61 which is inclined upwardly from the horizontal at an angle A of about fifteen degrees, and leads upwardly to a level platform 62 which is about one inch long and terminates at a one-half inch vertically offset stop 63 which is about one-half inches long. The L&S blocks 60 are made of any suitable tough wearing material such as steel or an aluminum alloy, and are about one-half inches thick, and are secured to the walls 18–20 of the housing 16 adjacent the outermost front end 64 of the housing 16, closest the tailgate 10, by any suitable means, e.g. screws or bolts. Each L&S block 60 has a bottom level surface 65 which is about six and three-eights inches long and is spaced about one and one-eighth inches from, and in parallel relation with, the short flanges 21, 22, 25 and 26 of the housing 16. The L&S blocks 60 each have a vertical flat back 66 which is about one and three-quarters inches long, and which is flush with the adjacent housing front end 64, when the L&S blocks 60 are secured to the housing 16.

The adaptations referred to in the previous paragraph include the provision of a forty-five degree chamfer 67 along the front top edge 68 of the top plate 16, and a solid, one-half inch diameter cylindrical steel bar or rod 69 which is welded in transverse relation across the innermost trailing or tail end 70 of each one of the short ramp sections 51. The rods 69 each have a pair of similar opposing ends 71 which extend or project beyond the adjacent opposing sides 41 and 42 of each ramp 35 for engaging the adjacent pair of L&S blocks 69 to slide upwardly along the block ramps 61 onto the platforms 62 where they come to rest after engaging the stops 63. The tops of the rods 69 are in general alignment with the outer, exposed perforated surface 38 of each of the short ramp sections 51. When the short ramp sections 51 are in such positions, the outer exposed surfaces 36 of the short ramp sections 51 are in close alignment with the underside of the top plate 17 of the housing 16. Thus, the reason for the chamfer 67 on the front edge 68 of the housing 16, i.e. to ramp the small offset between the adjacent outer exposed surfaces 16 and 51 of the housing 16 and ramps 35. The trailing end 70 of each of the short ramp sections 51 is cut away at a forty-five degree angle just below the steel rod 69 to remove a special ramp portion 72 which allows the leading end 56 of each ramp 35 to be tilted upwardly to allow the rod 69 to pass under and bypass the L&S blocks 60, whereby the ramps 35 can be removed from the housing 15, if desired. A dotted rod 69 is shown in FIG. 3 in a first position for initial engagement with the block ramp 61, and a second position where the rod 69 is escaping from the housing 16 between the bottom surface 65 of the L&S block 60 and the adjacent short flanges of the housing 16.

When short and long ramp sections 51 and 52 are used, it has been found advantageous to provide plastic guides 47 on the short flanges 45 and 46 of the short ramp sections 51 in combination with short plastic guides 47, shown in dotted line in FIG. 3, which are secured on the short flanges 21,22,25 and 26 of the housing 16 adjacent the open front end thereof. The normal size of the plastic guides 47 is such that they will not interfere with the escape of the short ramp sections 51 from the housing 16.

A number of similar hooks or eyes 73 can be strategically mounted on the housing 16 for receiving ropes or elastic tie downs with hooks for firmly holding down to the housing 16, such things as furniture. It can be appreciated that two relatively deep pockets are formed fore and aft of the rear tire fenders 11, when the housing 16 is, in position, on the truck bed 6. Such pockets are undesirable, because they are places where dirt and debris can accumulate This problem can be eliminated by securing atop the flat top plate 17, a second metal plate or piece of painted or waterproof plywood 74 which is shaped to completely cover the truck bed 6. A bead of calking can be used to seal the joints between the plywood 73 and adjacent sides of the truck bed 6 and the rear tire fenders 11, if desired.

The invention has been described in relation to a portable ramp assembly 15 which utilizes a housing 16 which is designed to accommodate two separate ramps 35. The invention can be used in housings 16 that are designed to hold one or more ramps 35, depending on the width of the housing 16. It should be mentioned that large pick-up trucks have an eight foot long flat bed which can accommodate an eight foot long housing 16 having one or more eight foot long ramps 35 which have been found to be ideally suited in the practice of this invention, as described. A problem arises when the invention is utilized in small pick-up trucks which have a flat bed which is only about six feet long. In such case, the length of the housing 15 and ramps 35 are not ideally sized, unless the six foot long ramps can be used with the tailgate 10 removed or in an unobstructing position. If not, the short six foot long ramps 35 must be lengthened by two feet to meet the ideal length of eight feet. This can best be done, for example, by mounting another short ramp section in telescoping relation within an open leading end of the longer ramp section of the six foot long ramp. In cases where the truck bed is higher, it will be necessary to provide even the eight foot long ramps 35 with telescoping ramp extensions so that the ramps 35 are at a desirable grade and not too steeply inclined.

Thus, there has been described a unique, lightweight, portable ramp assembly which is comprised of a housing and pair of ramps, and which can be attached to the flat bed of a pick-up truck, when such ramps are needed for loading such things as furniture or lightweight off the road vehicles onto the truck. The ramp assembly can be made of aluminum, steel, or plastic. However, for ease and simplicity of construction, the housing is built from conventional plate, channels and I-beams, and the ramps are preconstructed steel rams of standard lengths and widths and thickness. Special plastic guides are used to facilitate movement of the ramps within the housing. Also, unique blocks are used in the leading or front end of the housing to lift a specially adapted trailing end of each ramp to reduce any vertical offset which may occur between the outer exposed top surfaces of the housing and ramps.

What is claimed is:

1. A portable ramp assembly, comprising:
 a) a housing having a longitudinally extending, rectangular top plate secured at right angles to at least a pair of opposing side walls which are parallel and coextensive with the longitudinal length of the top plate, the side walls having the same width, measured from the top plate, the side walls having parallel, longitudinally extending marginal edges at which are disposed a pair of short flanges which are coextensive with the side walls, and which extend towards each other, and which are in the same plane which is parallel to the plane of the top plate which, together with the side walls and short flanges, form at least one compartment within the housing which has an open front end and an open bottom between the short flanges;
 b) at least one ramp slidably disposed in the at least one compartment of the housing and movable longitudinally thereof, the ramp having a rectangular cover plate which is secured at right angles to a pair of parallel side walls which are at least coextensive with the length of the cover plate, the sidewalls of the ramp having the same width, measured from the cover plate, and a pair of parallel, longitudinal marginal edges at which are disposed a pair of short flanges which extend towards each other and which are in the same plane which is parallel to the plane of the cover plate, the short flanges of the ramp being supported on, and movable along, the corresponding short flanges of the housing, the ramp having a leading end which is first to exit the housing and a trailing end which is opposite the leading end;
 c) a rod transversely disposed at the trailing end of the ramp within the housing, the rod disposed adjacent the cover plate of the ramp and having a pair of opposing ends which project beyond adjacent side walls of the ramp; and
 d) a pair of similar but oppositely disposed blocks secured to the side walls of the housing in spaced relation from adjacent short flanges thereof, the blocks being adjacent the open front end of the housing, the blocks each having, I) a flat surface which is parallel to an adjacent short flange of the housing and spaced therefrom a distance sufficient to form a passageway for slidably receiving the projecting rod ends therebetween whereby the ramp can be removed from the housing, II) an inclined ramp extending from the flat surface in a direction away from the adjacent short flange of the ramp and towards the open end of the housing, for engaging an adjacent projecting end of the rod and directing it upwards towards the cover plate onto, III) a platform which is parallel to the adjacent short flange of the ramp and which terminates at, IV) a stop for preventing the unintended accidental removal of the ramp from the housing, the blocks designed to lift the trailing end of the ramp to reduce any offset between misaligned outer exposed surfaces of the housing and trailing end of the ramp, a portion of the trailing end of the ramp, between the rod and adjacent short flanges of the ramp, being removed and angularly disposed to allow tilting the trailing end and attached rod of the ramp in the direction of the adjacent short flanges of the housing, such that the rod ends become aligned with the passageways and will pass through the passageway and out the open end of the housing, as the tilted ramp is pulled from the housing.

2. The portable ramp assembly of claim 1, wherein the projecting ends of the rod are cylindrical, in shape, the rod reinforcing the trailing end of the ramp which end is at an angle that is not greater than about 45 degrees measured clockwise from the planes of the cover plate of the ramp, when the cover plate is horizontally disposed.

3. The portable ramp assembly of claim 2, which includes;
 e) durable plastic guides disposed between the short flanges of the housing and the corresponding short flanges of the ramp to facilitate movement of the ramp along the short flanges of the housing, the guides having rectangular cross sections and sized to maintain the ramps in correct lateral alignment as they move within the compartment of the housing.

4. The portable ramp assembly of claim 3, wherein the plastic guides are secured to the short flanges of the ramps and are at least partially coextensive therewith, a short plastic guide being optionally secured to the short flanges of the housing adjacent the open end thereof.

5. The portable ramp assembly of claim 4, wherein the housing is designed to fit in the flat bed of a pick-up truck, and as such it is substantially as long as the flat bed, and no wider than the distance between fenders of the rear wheels of the truck.

6. The portable ramp assembly of claim 5, wherein the housing is composed of aluminum and is about four feet wide and comprises a pair of side walls which are a pair of oppositely disposed, conventional channel sections, and the housing includes an inner wall which is a conventional I-beam centrally disposed between the channel sections and coextensive therewith to divide the housing longitudinally into two similar compartments for slidably receiving a pair of similar ramps.

7. The portable ramp assembly of claim 4, wherein each ramp includes at least a short section and a long section which are mounted together for relative rotation, the long section having a free end which is the leading end of the ramp, and the short section having an opposing free end which is the trailing end of the ramp, the short section being substantially as long as the tailgate of a pick-up truck is wide, the long section being sufficiently long to form a desired incline relative to the flat bed of the truck.

8. The portable ramp assembly of claim 4 wherein the front top edge of the top plate of the housing is chamfered to reduce any abrupt offset between tops of the housing and ramps.

9. The portable ramp assembly of claim 8, wherein outer exposed surfaces of the ramps are non-skid surfaces.

10. The portable ramp assembly of claim 4, which includes a plurality of thin, rigid cross-ties disposed transversely of the housing and longitudinally spaced thereof and secured to the short flanges thereof to increase the rigidity of the housing.

11. The portable ramp assembly of claim 4, wherein the housing and ramp are composed of materials of the group of aluminum, steel and plastic.

12. A portable ramp assembly comprising:
   a) a metal housing including a rectangular top plate which is secured at right angles to a pair of parallel side walls and a an inner wall which is centrally disposed between the side walls, the walls being coextensive with the length of the top plate and having free marginal edges which are equidistant from the top plate, the side walls having at their marginal edges a pair of short flanges which extend towards each other, the inner wall having at its marginal edge a pair of opposing short flanges which extend towards opposing flanges of the side walls, the short flanges being in the same plane which is parallel to the plane of the top plate, the inner wall dividing the housing longitudinally into two similar compartments, the housing having an open front end in opposed relation to a closed back end, and an open bottom between opposing short flanges of the inner wall and side walls;
   b) a metal ramp slidably mounted in each of the compartments of the housing and being at least coextensive with the length of the housing, when the ramp is retracted within the housing, each ramp having a cover plate with a non-skid outer exposed surface, the cover plate being secured at right angles to a pair of parallel, equally sized side walls which are at least coextensive with the length of the cover plate, the side walls of each ramp having a pair of free longitudinal marginal edges at which are disposed a pair of short flanges which extend towards each other, the short flanges of the ramps being in the same plane which is parallel to the plane of the cover plate, the short flanges of the ramps being supported on, and slidable along the short flanges of the housing, each ramp having a shorter section in tandem with a longer section which is rotatably mounted to the shorter section, the longer ramp section having a free leading end for engaging a flat surface, the shorter ramp section having a free trailing end which has a cylindrical rod secured transversely across it, the cylindrical rod having a pair of opposing ends which project laterally beyond the side walls of the ramps, the trailing end of the shorter ramp sections having a portion thereof removed between the rod and short flanges of the ramps to allow the sections of the ramp to be tilted upwards in a direction away from the short flanges of the housing;
   c) a metal block secured to each of the opposing walls of each compartment of the housing adjacent the front end of the housing, each block having a flat surface in parallel relation with the short flanges of the housing and spaced therefrom such that the ends of the rod can pass from the housing between the short flanges of the housing and the blocks when the ramp sections are tilted, each block including an inclined ramp which extends from the flat surface in a direction towards the cover plate and open end of the housing for engaging an adjacent rod end and directing it upwards away from the short flanges of the housing onto a platform of the block where the rod end engages a stop of the block, which stops prevent the trailing ends of the shorter ramp sections from being unintentionally removed from the housing, the platform of each block being parallel to the adjacent short flange of the housing, the blocks designed to lift the trailing ends of the ramps to where the outer exposed surfaces of the ramps are more nearly in line with an adjacent outer exposed surface of the top plate of the housing; and
   d) a plastic guide disposed between each short flange of the housing and adjacent juxtaposed short flange of the ramps to facilitate movement of the ramps and maintain the ramps in lateral alignment within the housing, the guides being secured to the short flanges of the ramps and being at least partially coextensive therewith.

13. The portable ramp assembly of claim 12, wherein the side walls of the housing are standard channels, and the inner wall is a standard I-beam.

14. A portable ramp assembly, comprising:
   a) a metal housing including a rectangular top plate which is secured at right angles to a pair of parallel standard channel side walls and a standard I-beam inner wall which is centrally disposed between the side walls, the walls being coextensive with the length of the top plate and having free marginal edges which are equidistant from the top plate, the side walls having at their marginal edges a pair of short flanges which extend towards each other, the inner wall having at its marginal edge a pair of opposing short flanges which extend towards opposing flanges of the side walls, the short flanges being in the same plane which is parallel to the plane of the top plate, the inner wall dividing the housing longitudinally into two similar compartments, the housing having an open front end in opposed relation to a closed back end, and an open bottom between opposing short flanges of the inner wall and side walls;
   b) a metal ramp slidably mounted in each of the compartments of the housing and being at least coextensive with the length of the housing, when the ramp is retracted within the housing, each ramp having a cover plate with a non-skid outer exposed surface, the cover plate being secured at right angles to a pair of parallel, equally sized side walls which are at least coextensive with the length of the cover plate, the side walls of each ramp having a pair of free longitudinal marginal edges at which are disposed a pair of short flanges which extend towards each other, the short flanges of the ramps being in the same plane which is parallel to the plane of the cover plate, the short flanges of the ramps being supported on, and slidable along, the short flanges of the housing, each ramp having a shorter section in tandem with a longer section which is rotatably mounted to the shorter section, the longer ramp section having a free leading end for engaging a flat surface, the shorter ramp section having a free trailing end which has a cylindrical rod secured transversely across it, the cylindrical rod having a pair of opposing ends which project laterally beyond the side walls of the ramps, the trailing end of the shorter ramp sections having a portion thereof removed between the rod and short flanges of the ramps to allow the sections of the ramp to be tilted upwards in a direction away from the short flanges of the housing;

c) a metal block secured to each of the opposing walls of each compartment of the housing adjacent the front end of the housing in spaced relation from the short flanges of the housing, each block including an inclined ramp for engaging an adjacent rod end and directing it upwards away from the short flanges of the housing onto a platform of the block where the rod end engages a stop of the block, which stops prevent the trailing ends of the shorter ramp sections from being unintentionally removed from the housing, the platform of each block being parallel to the adjacent short flange of the housing, the blocks designed to lift the trailing ends of the ramps to where the outer exposed surfaces of the ramps are more nearly in line with an adjacent outer exposed surface of the top plate of the housing; and d) a plastic guide disposed between each short flange of the housing and adjacent juxtaposed short flange of the ramps to facilitate movement of the ramps and maintain the ramps in lateral alignment within the housing, the guides being secured to the short flanges of the ramps and being at least partially coextensive therewith, and each ramp is composed of at least two prefabricated steel ramps that are secured together in side-by-side relation, the prefabricated ramps of each ramp having coplanar cover plates, a portion of the trailing end of each short ramp section, between the rod and short flanges of the short section, being removed to allow the ramps to be sufficiently tilted so that the rod can pass between the lifting blocks and short flanges of the housing, whereby the ramps are removed from the housing.

15. The portable ramp assembly of claim 14, wherein the cover plates of the ramps are perforated with a number of holes.

16. The portable ramp assembly of claim 15, wherein the housing and ramps therein are about eight foot long, and the leading ends of the longer sections of the ramps are at an angle for better contact with a flat surface.

17. The portable ramp assembly of claim 14, which includes, an extension ramp for extending the length of each one of the longer sections of the ramps after the ramps are at least partially removed from the housing, and means for mounting the extension ramps on the leading ends of the longer ramp sections such that the extension ramps will not interfere with moving the ramps and attached extension ramps into the housing.

18. The portable ramp assembly of claim 12, wherein plastic guides are secured only to the short flanges of the shorter ramp sections, and a short plastic guide is secured to each short flange of the housing adjacent the open front end thereof.

19. The portable ramp assembly of claim 18, wherein each block has a bottom surface which intersects the block ramp and which is parallel to the adjacent short flange of the housing, the space between the bottom block surface and the short flange of the housing being such that the rod ends can pass through said space and around the short plastic guides when the ramps are tilted and pulled outwardly away from the housing.

20. The portable ramp assembly of claim 19, wherein the included angle (A) between the ramp and bottom surface of each block is in the range of from 15 to 35 degrees, and the top front edge of the top plate of the housing is chamfered at an angle to reduce any abrupt offset between the top plate and ramps.

* * * * *